(12) United States Patent
Erikstrup et al.

(10) Patent No.: US 8,409,759 B2
(45) Date of Patent: Apr. 2, 2013

(54) SEAL FOR A FUEL CELL SUPPORT

(75) Inventors: Niels Erikstrup, Frederiksberg (DK);
Niels Christiansen, Gentofte (DK);
Haldor F. A. Topsøe, Vedbæk (DK)

(73) Assignee: Topsoe Fuel Cell A/S, Lyngby (DK)

( * ) Notice: Subject to any disclaimer, the term of this patent is extended or adjusted under 35 U.S.C. 154(b) by 0 days.

(21) Appl. No.: 13/457,080

(22) Filed: Apr. 26, 2012

(65) Prior Publication Data

US 2012/0205042 A1 Aug. 16, 2012

Related U.S. Application Data

(63) Continuation of application No. 12/240,687, filed on Sep. 29, 2008, now Pat. No. 8,227,131.

(51) Int. Cl.
*H01M 8/00* (2006.01)
*B23K 31/02* (2006.01)

(52) U.S. Cl. ............... 429/400; 429/535; 156/272.8

(58) Field of Classification Search .............. 156/272.8, 156/60; 228/101; 429/400, 535
See application file for complete search history.

(56) References Cited

U.S. PATENT DOCUMENTS

| 4,450,212 A | 5/1984 | Feigenbaum et al. |
| 2002/0048699 A1* | 4/2002 | Steele et al. ............. 429/30 |
| 2007/0042251 A1 | 2/2007 | Friedman |
| 2007/0248867 A1* | 10/2007 | Haltiner et al. .......... 429/38 |

FOREIGN PATENT DOCUMENTS

| EP | 1 010 675 A1 | 6/2000 |
| EP | 1 122 806 A1 | 8/2001 |
| WO | WO-03-73546 A1 | 9/2003 |
| WO | WO-2006-111847 A2 | 10/2006 |
| WO | WO 2007/080518 | 7/2007 |

* cited by examiner

*Primary Examiner* — Mark F Huff
*Assistant Examiner* — Monique Wills
(74) *Attorney, Agent, or Firm* — Dickstein Shapiro LLP

(57) ABSTRACT

A unit for use in a fuel cell stack, the unit comprising a porous metal support with a seal made by local fusion and—having a seal depth that extends from the upper surface of the porous metal support to at least the bottom surface of the porous metal support, and wherein the seal is positioned along the periphery of the porous metal support, the seal being impermeable to gas transported in the plane of the porous metal support.

12 Claims, 9 Drawing Sheets

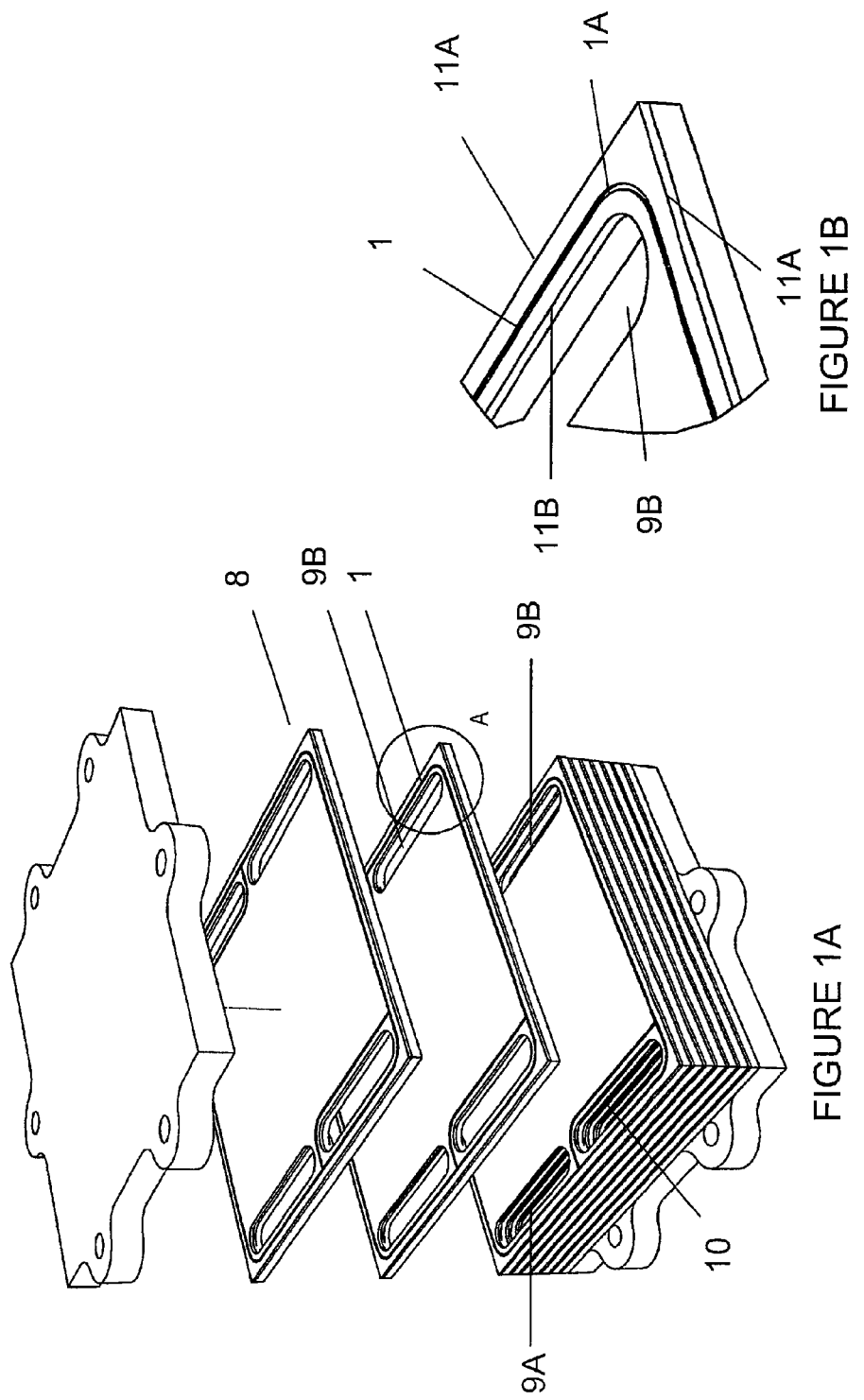

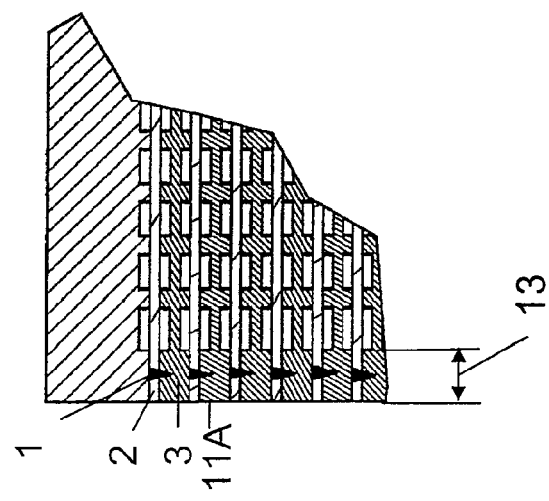
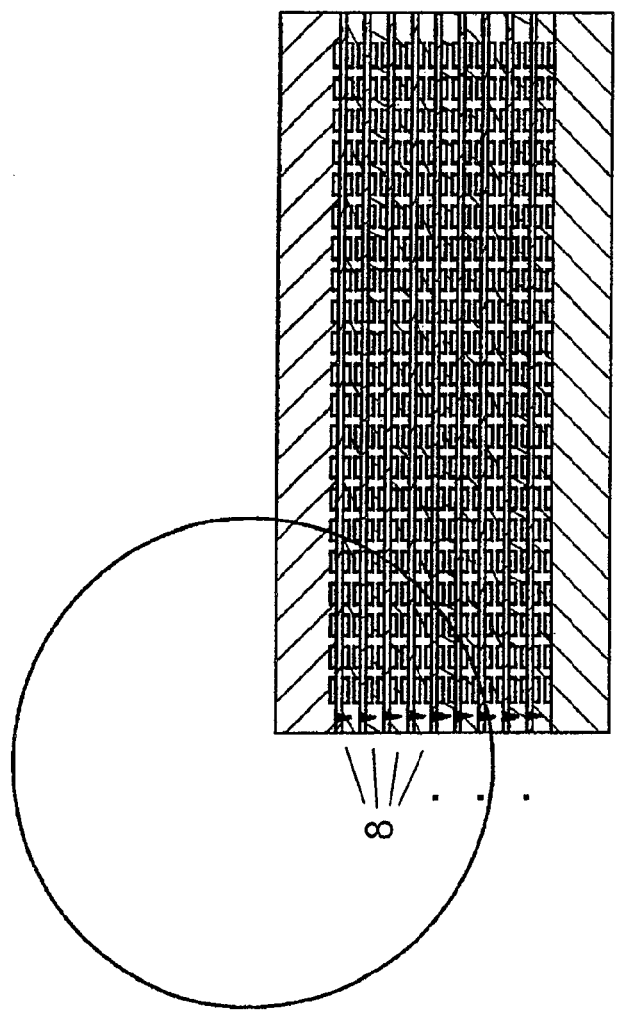
FIGURE 2A
FIGURE 2B
FIGURE 2

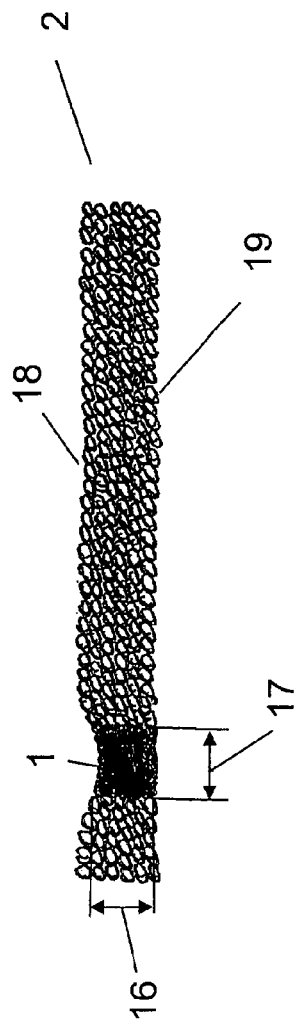
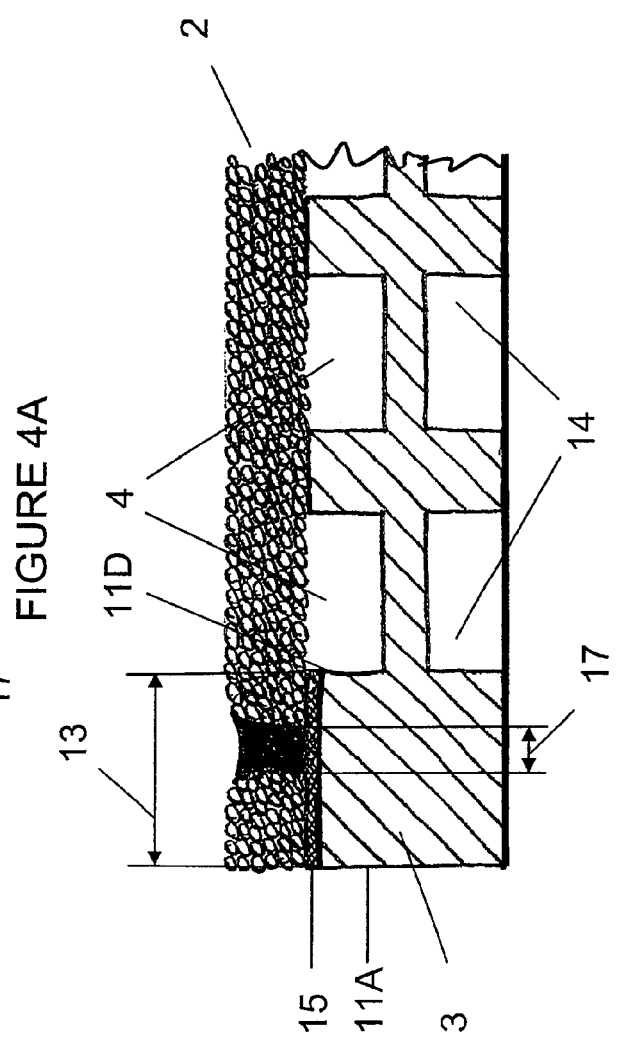
FIGURE 4

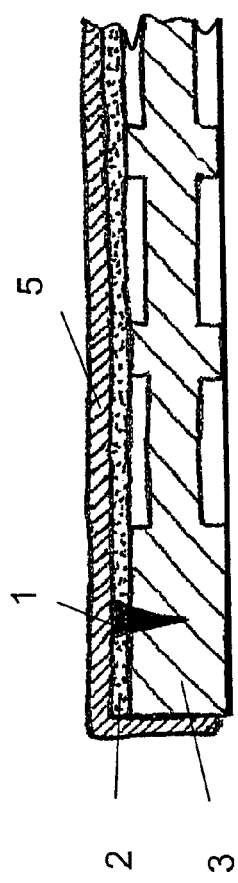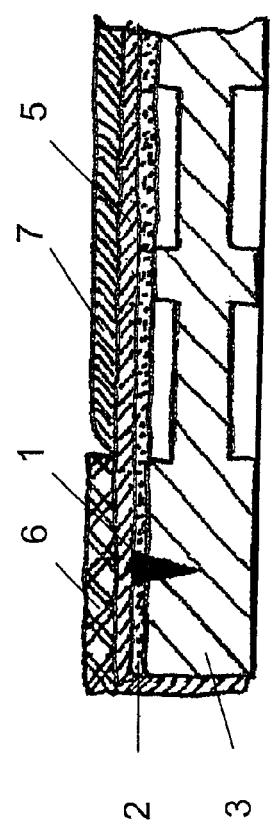
FIGURE 6A
FIGURE 6B
FIGURE 6

SEAL FOR A FUEL CELL SUPPORT

This is a continuation of application Ser. No. 12/240,687, filed Sep. 29, 2008 now U.S. Pat. No. 8,227,131, the entirety of which is incorporated herein by reference.

FIELD OF THE INVENTION

The present invention relates to a unit for a fuel cell stack, in particular a unit for a solid oxide fuel cell stack, the unit comprising a porous metal support with a seal wherein the seal extends from the upper surface of the porous, metal support to the bottom surface of the porous, metal support so that in use unwanted gas transport in the porous metal support is blocked by the seal.

BACKGROUND OF THE INVENTION

External leakage of gases from a fuel cell stack is either due to cracks in ceramic components, failed seals or gas transport through porous layers.

In a fuel cell stack comprising a number of cells, each cell comprises a gas tight and oxygen ion conducting electrolyte and a porous cathode and a porous anode. The reactants can diffuse through the porous layers so the reaction can take place. An electrochemical process takes place when hydrogen is transported to the anode and oxygen is transported to the cathode thereby allowing oxygen ions from the cathode to be transported via the electrolyte to the anode whereby hydrogen on the anode reacts with the oxygen in this way creating $H_2O$ and a transport of electrons.

Porous anodes and cathodes can be prepared from ceramic powder. Also porous supports for e.g. anodes are known, where the porous supports are based on powder metallurgy. An example of a porous support is e.g. described in EP patent application No. 1122806 in which the gas supply channels with the cell support and the anode layer are integrated. Since the support is porous, part of the gas diffuses through the support to the electrolyte while another part of the gas is transported to the rim of the support. In order to avoid leakage to the surroundings the rim is gas impermeable.

A gas impermeable rim can be obtained by using glass as a sealing material as disclosed in EP patent application No. 1010675. A drawback of using glass is that it is brittle and that its thermal properties are quite different from the thermal properties of metal, which may cause difficulties when the stack is heated or cooled during operation.

Furthermore, due to their high viscosities, glass melts are difficult to impregnate into the porous layer.

WO 2007080518 describes a fuel cell unit which on the outside is sealed by injection moulding.

It is an object of the invention to provide a unit for a fuel cell stack in which gas leakage to the surroundings is prevented.

It is another object to provide an alternative way of reducing the number of elements in a fuel cell stack.

It is a further object to provide a fuel cell that is more robust to thermal stress during use.

SUMMARY OF THE INVENTION

Some of these and other objects are fulfilled according to a first aspect of the invention by a unit for a fuel cell stack, the unit comprising a porous metal support with a seal having a seal depth that extends from the upper surface of the porous metal support to at least the bottom surface of the porous metal support, wherein the seal is positioned along a periphery of the porous metal support, the seal being impermeable to gas transported in the plane of the porous metal support.

The invention also concerns a method of manufacturing a unit for a fuel cell stack, comprising the steps of fusing a part of a porous metal support along its periphery in a contact area into a gas impermeable seal with a seal depth, the seal depth extending from the upper surface of the porous metal support and at least through the porous metal support to the bottom of the porous metal support.

BRIEF DESCRIPTION OF THE DRAWINGS

FIG. 1 illustrates a solid oxide fuel cell stack with a number of units.
FIG. 2 shows a cross section of a solid oxide fuel cell stack.
FIG. 4 shows a seal in a porous metal support.
FIG. 6 shows different units for a solid oxide fuel cell.

DETAILED DESCRIPTION OF THE INVENTION

Figure 3:
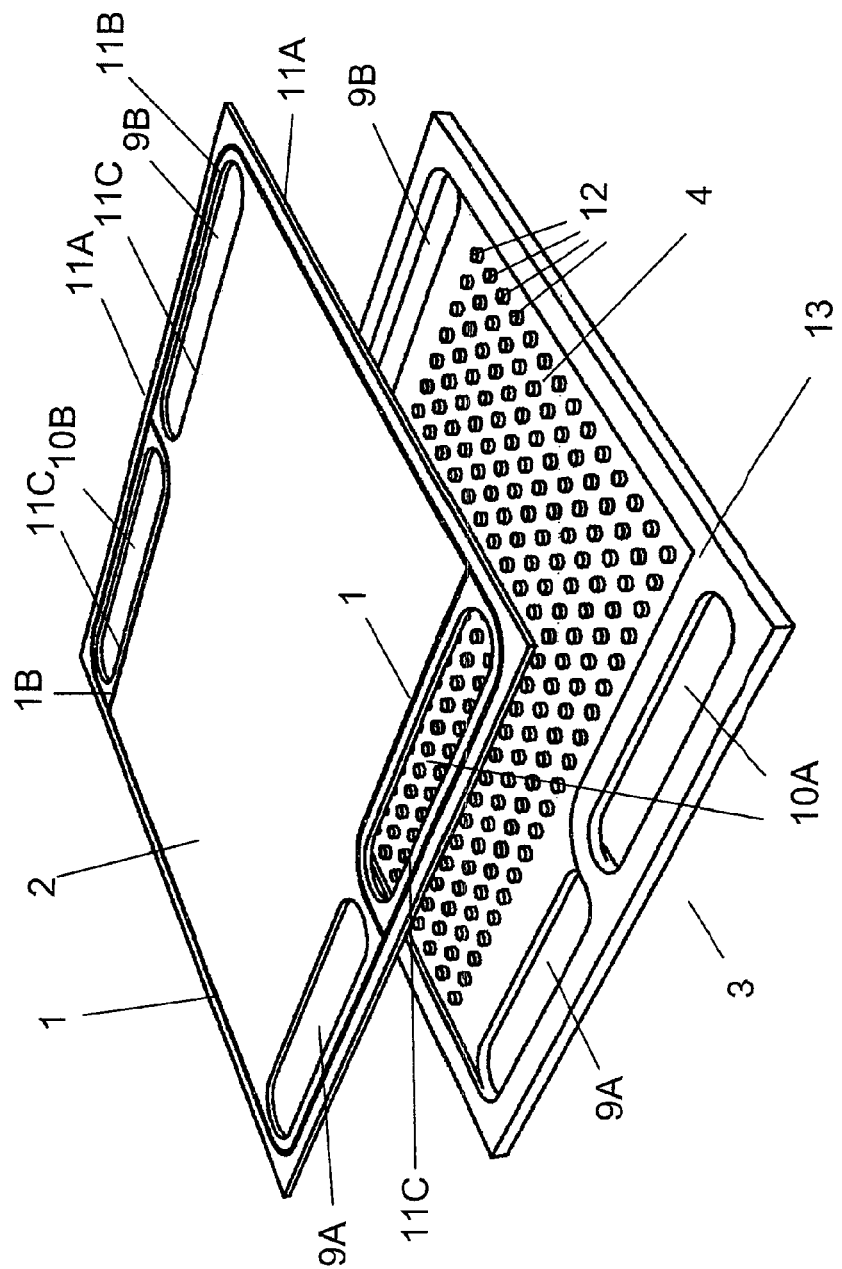
FIG. 3 shows an example of a unit for a solid oxide fuel cell.

The invention provides a unit for a fuel cell stack which comprises a porous metal support with a seal, whereby leakage of gases to the surroundings is prevented.

When the unit is stacked in a fuel cell the seal may further be positioned in a contact area between the porous metal support and the interconnect. In this way unwanted gas transport in the porous metal support is blocked by the seal.

A unit for a fuel cell stack comprises one or more components.

A component is e.g. a porous metal support, an interconnect, an anode, a cathode, an electrolyte, a sealing material or a distance member.

The contact area is an area where a part of the surface of the porous metal support when stacked in a fuel cell stack is in contact with a part of the surface of another element in the fuel cell stack.

A gas is a gas for use in a fuel cell stack during operation.

The terms upper surface and lower surface should be understood as the surface facing upwards respectively downwards when the element for a fuel cell is placed in a horizontal position as illustrated in the figures.

The porous metal support has a porosity that allows gas to diffuse to an anode or a cathode. The porosity of the porous, metal support may be from 20 vol % to 90 vol % preferably between 30 vol % to 70 vol %. The mean pore size of the porous metal support is preferably in the range from 0.1 μm to 100 μm.

In an embodiment of the invention the porous metal support is a porous metal foil, e.g. made of a ferritic stainless steel such as Thyssen Krupp Crofer 22 APU. The porous metal foil may e.g. have a thickness between 0.05 mm and 0.3 mm.

It is an advantage to use a thin porous foil in order to enhance diffusion rate to anode or cathode, and further it provides for a more compact fuel cell stack.

The porous metal support can also be a foil containing a plurality of perforations, cavities and/or small holes providing the gas diffusion path. This porous metal support can be prepared by for instance chemical etching and the perforations, cavities and/or small holes can be positioned to form a controlled pattern in the porous metal support.

The porous metal support may be made of sintered metal powder, thereby providing a porous metal foil. The metal interconnect may also be made of ferritic stainless steel and its thickness may e.g. be between 0.1 mm and 8 mm. The metal interconnect may be made of a metal foil, in which case the interconnect comprising flow fields can be formed by pressing the metal foil.

In an embodiment of the invention the seal is made by a local fusion of the grains in the porous metal support. Such a seal will be more robust to thermal stress during use in a fuel cell stack than e.g. an external glass coat sealing that may crack during use such that gases may leak to the surroundings. Preferably, the local fusion is made by a process selected from laser heating, electrical resistance heating, electron beam heating and brazing.

In an embodiment of the invention the seal is made by filling the pores of the porous metal support with a filler material e.g. a braze followed by heating to create the seal.

In another embodiment of the invention at least part of the seal is positioned along the periphery of a gas channel. In this way it is avoided that different gases are mixed during use. A gas channel could e.g. be an oxidant inlet, oxidant outlet, fuel inlet or fuel outlet.

In yet another embodiment of the invention the porous, metal support is a metal foil.

In another embodiment of the invention the seal is positioned in a contact area between a component and the porous metal support. Preferably, the component is an interconnect. The seal depth may extend further into the interconnect thereby further providing an impermeable gas seal between the porous metal support. In this way it is not necessary to provide a sealing material between the interconnect and the porous metal support thereby the number of components in a fuel cell stack is reduced.

The interconnect has a channel system having one or more gas channels such that when it is in use in a fuel cell stack gas is distributed over the electrochemically active area. The electrochemically active area is the area of a cell in a fuel cell stack where the electrochemical reaction takes place. A cell comprises an anode, electrode and a cathode. The interconnect can e.g. be manufactured by powder metallurgy, forging, rolling or etching.

In an embodiment of the invention a ratio in a cross section of the unit between a seal width at the bottom surface of the porous metal support and a contact area width of the contact area in the cross section is less than 1. Preferably, the ratio is less than 0.3. The seal width may e.g. be between 0.1 mm and 3.0 mm such as between 0.5 mm and 1.5 preferably 1 mm.

In another embodiment an anode is applied inside the porous structure. The anode may be made of nickel crystals. It is an advantage to orientate the unit so that the reducing gas is next to the porous metal support, since oxidising conditions may harm the metal or cause evaporation of oxides.

In yet an embodiment of the invention the porous metal support is positioned on the cathode side in close contact with the electrochemically active cathode.

The unit may further comprise an electrolyte, a cathode, and a cathode side sealing material, such that when the unit is in use fuel and air are sealed from the surroundings. The cathode side sealing material may e.g. be glass, braze of metal or mica.

In yet another embodiment of the invention the unit is for use in a high temperature fuel cell, a high temperature fuel cell typically has operation temperatures above 500° C. e.g. a Solid Oxide Fuel Cell Stack.

The invention provides also for a fuel cell stack, in particular a solid oxide fuel cell stack, comprising one or more units according to any one of the embodiments described above.

In a second aspect of the invention a method of manufacturing a unit for a fuel cell stack is provided, the method comprising the steps of fusing a part of a porous metal support along its periphery into a gas impermeable seal with a seal depth, the seal depth extending from the upper surface of the porous metal support and at least through the porous metal support to the bottom surface of the porous metal support.

When the unit is in use in a fuel cell stack gas transported in the plane of the porous metal support towards the periphery is blocked by the seal. In this way gas leakage to the surroundings is avoided.

In an embodiment of the invention the electrochemically active area of the fuel cell is segmented into a larger number of smaller individual electrochemically active segments on a support structure. Each segment comprises an electrochemically active electrolyte, anode and cathode. When the fuel cell is segmented in this manner then the section of the porous metal foil at each electrochemically active segment is sealed in the position corresponding to the segments individual periphery by fusing a part of the porous metal support in the region of the segment. In this manner each segment can be completely sealed at its periphery on all sides of the segment.

In another embodiment of the invention the step of fusing a part of a porous metal support further comprises simultaneous fusion with a part of an interconnect such that the seal depth further extends into the interconnect so that when the unit is in use in a fuel cell stack transport of gas between the interconnect and the porous metal support is blocked.

In yet another embodiment of the invention the step of fusing the seal is performed by means of a laser beam.

In another embodiment of the invention the seal is made brazing whereby the pores of the porous metal support are filled with a filler material and heated to create the seal.

In another embodiment of the invention the method further comprises a step of applying an anode inside the porous structure in the porous metal support.

The method may also comprise a step of applying an electrolyte by plasma spraying and yet another step of applying a cathode by a process such as serigraphy, plasma spraying or a wet spraying process.

The method may also comprise a step of applying a cathode side sealing material, such that when the fuel cell stack is in use, cathode gas is sealed from the surroundings.

FIGS. 1A and 1B in FIG. 1 illustrate a solid oxide fuel cell stack with a number of units. FIG. 1A shows an exploded view of a solid oxide fuel cell stack. The fuel cell stack comprises one or more repetitive units 8 each having a porous metal support. The stack has a fuel inlet 9 and an oxidant inlet 10. During operation fuel is supplied from the fuel inlet 9 and spread out across each cell in the repetitive units 8. Likewise, an oxidant is supplied from the oxidant inlet 10 to each cell in the repetitive units 8.

FIG. 1B shows a close up of a corner of the repetitive unit 8. The seal 1 is a continuous gas impermeable region that stretches along a periphery of the repetitive unit 8 in the contact area such that leakage of fuel to the surroundings is blocked. One section of the seal 1 stretches parallel to, and along the outer periphery 11A of the repetitive unit 8. Another section of the seal stretches parallel to, and along the outer periphery 11A of the repetitive unit 8 as well as parallel to, and along part of the inner periphery 11B that constitutes the circumference of the fuel outlet 9B. The two sections are connected by a curvature 1A. In this way fuel leakage to the surroundings is blocked.

FIG. 2 shows an embodiment of the invention with a vertical cross section of a solid oxide fuel cell stack similar to the one illustrated in FIG. 1. In FIGS. 2A and 2B it is illustrated how a solid oxide fuel cell is built up by a number of repetitive units 8 (shown in FIG. 2B) each with the seal 1 penetrating through the porous metal support 2 and into the interconnect 3 (shown in FIG. 2A). The seal 1 is positioned in the contact area.

FIG. 3 is an exploded view of a unit 8 for solid oxide fuel cell stack as illustrated in FIG. 1A. In this embodiment the interconnect 3 has a system of fuel channels 4 on its upper surface. The fuel channels 4 are formed in between pillars 12. The channels 4 are elongated and the channels stretch across the area of the interconnect 3 such that they cover the electrochemically active area of the interconnect 3. Likewise, the interconnect 3 has a system of channels on its lower surface (not shown in the figure) for distribution of the oxidant. It is well known in the art to use channel systems with various geometries as long as they cover the central area of the interconnect such that fuel and oxidant are spread over the electrochemically area.

The interconnect 3 has a fuel inlet 9A and a fuel outlet 9B, further it has an oxidant inlet 10A and an oxidant outlet 10B. Likewise the porous metal support 2 has a fuel inlet 9A and a fuel outlet 9B and an oxidant inlet 10A and an oxidant outlet 10B. Thus, when the repetitive units 8 are positioned one upon another in a solid oxide fuel cell stack a fuel inlet conduit is formed of a number of fuel inlets 9A and a fuel outlet conduit is formed of a number of fuel outlets 9B, likewise an oxidant inlet conduit is formed of a number of oxidant inlets 10A and an oxidant outlet conduit is formed by a number of oxidant outlets 10B.

FIG. 3 further shows the position of the seal 1 in the porous metal support 2. Part of the seal 1 encapsulates the porous metal support plate 2 and stretches along its periphery 11A such that in use in a solid oxide fuel cell stack, fuel diffusion in the plane of the porous metal support 2 is blocked by the seal 1, thereby avoiding leakage from the solid oxide fuel cell to the surroundings. Other parts of the seal 1B encapsulates the oxidant inlet 10A and oxidant outlet 10B and stretches along their periphery 11C in the contact area such that in use diffusion of gas from the oxidant inlet 10A into the fuel side of the porous metal support 2 is avoided. Likewise, diffusion of fuel from the porous metal support 2 into the oxidant inlet 10A or oxidant outlet 10B is avoided.

Thus, when a repetitive unit 8 having a porous metal support 2 and an interconnect 3, as shown in FIG. 3, is in use in a solid oxide fuel cell stack, fuel from the fuel inlet 9A is spread over the entire electrochemically active area of the fuel cell via the system of channels 4 on the fuel side of the interconnect 3 and the fuel diffuses into the porous metal support 2. Fuel leaves the fuel cell via the fuel outlet 9B.

In use gas from the oxidant inlet 10A is spread over the electrochemically active area via the system of channels on the oxidant side of the interconnect 3 and is transferred out of the fuel cell via the oxidant outlet 10B. The seal 1B blocks the oxidant from being mixed up with the fuel, i.e. the seal 1B blocks gas from the oxidant inlet 10A mixing up with fuel in the porous metal support 2 and the seal 1B blocks fuel from the electrochemically area to be led into the oxidant outlet 10B.

FIGS. 4A and 4B in FIG. 4 show a seal in a porous metal support. FIG. 4A illustrates an embodiment of the invention of a porous metal support 2 with a seal 1. The seal 1 is made by a heating source e.g. a laser beam that fuses the porous metal support locally into a massive barrier that is impermeable to gas. This figure also shows the seal depth 16 of the seal 1 extending from the upper surface 18 through the porous metal support 2 to the bottom surface 19 thereof. The seal further has a seal width 17 at the bottom surface 19 of the porous metal support.

In FIG. 4B the porous metal support 2 in FIG. 4A is sealed to an interconnect 3 by a sealing material 15. It appears in the figure that the seal 1 in the porous metal support 2 is positioned in the contact area 13 between the porous metal support 2 and the interconnect 3. It further appears in this figure that also the sealing material 15 is positioned in the contact area 13. The sealing material 15 stretches over the contact area width 13 of the contact area in the cross section, whereas the seal 1 has a seal width 17 at the bottom surface 18 that is less than the contact area width 13. The contact area 13 stretches from the periphery 11A of the interconnect 3 to the periphery of the channel system 11D or a periphery of a gas channel.

The interconnect 3 is e.g. made of metal foil having a plurality of channels 4 forming a channel system on the fuel side and a plurality of channels 14 forming a channel system on the oxidant side of the interconnect 3.

Figures 5, 5A, 5B:
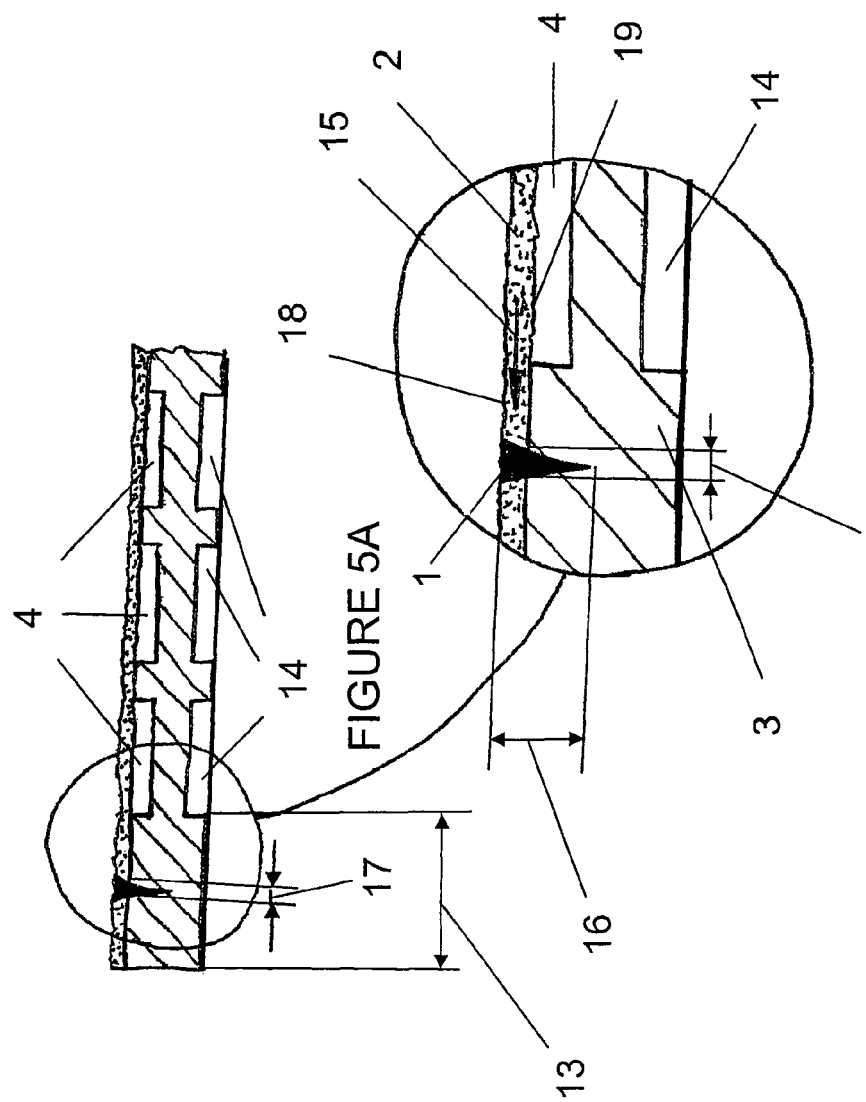
FIG. 5 shows a porous metal support that is sealed together with an interconnect.

FIGS. 5A and 5B in FIG. 5 show a porous metal support that is sealed together with an interconnect. FIG. 5A shows a preferred embodiment of the invention where the seal 1 in the porous metal support 2 further penetrates into the interconnect 3 thereby creating a seal between the porous metal support 2 and the interconnect 3.

This embodiment is illustrated in an expanded view in figure 5B, where the penetration depth 16 extends from the upper surface 18 of the porous metal support 2 into the interconnect 3. Also in this embodiment the seal width 17 at the bottom surface 19 of the porous metal support 19 is less than the contact area width in the cross section of the contact area 13. The seal 1 is positioned at a distance from the periphery.

The seal 1 in the porous metal support 2 may e.g. be made by a thermal process e.g. by brazing, electrical resistance heating or heating by a laser beam. In this way a seal 1 is created such that when the unit is in use in a fuel cell stack, gas diffusing within the porous metal support 2 in a direction toward the border (indicated by an arrow 15) is stopped by the seal 1. Flow of gas out of the fuel cell stack is then prevented.

For all of the embodiments the seal 1 is made by fusing the grains of the porous metal support such that a locally massive barrier is made, thereby creating a seal 1 with a seal depth 16 extending at least from the upper surface of the porous metal support 2 to the bottom surface of the porous metal support 2. The fusion may in some embodiments penetrate further into other metal elements for a solid oxide fuel cell e.g. an interconnect, such that the seal depth 16 extends into the other metal element thereby creating a seal preventing gas transport between the porous metal support and the other metal element.

Both the interconnect 3 and the porous metal support 2 may be made of a metal alloy such as ferritic stainless steel or other ferritic steels, or a nickel based or chromium based alloy. The porosity of the metal foil may be between 30 vol % to 70 vol % and the mean pore size of the porous metal support is in the range from 0.1 μm to 100 μm.

The porous metal support 2 may e.g. be made of sintered metal powder, thereby providing a porous metal foil. The foil may e.g. be between 0.05 mm and 0.3 mm thick. The metal interconnect 3 may e.g. be between 0.5 mm and 8 mm.

The porous metal support 2 is on the fuel side applied with an anode e.g. in form of nickel crystals. Hereafter an electrolyte 5 is applied on the anode surface e.g. by plasma spraying or spray coating, dip moulding, layer casting or electrophoretic deposition.

FIGS. 6A and 6B in FIG. 6 show different units for a solid oxide fuel cell. In one embodiment the electrolyte is applied not only on the porous metal support but also on the side perpendicular to the upper surface and bottom surface of the porous metal support 2 and the interconnect 3 as illustrated in FIG. 6A.

On the surface of the electrolyte 5 a cathode 7 is applied, e.g. by serigraphy. This is shown in FIG. 6B, which also shows a cathode gas seal 6, which in use in a fuel cell stack, blocks the cathode gas from flowing from the solid oxide fuel cell stack to the surroundings. The oxidant seal 6, could e.g. be made of glass or a metal braze or another sealing material such as mica. In this way a repetitive unit 8 comprising a cell, interconnect and seals is created.

Figure 7:
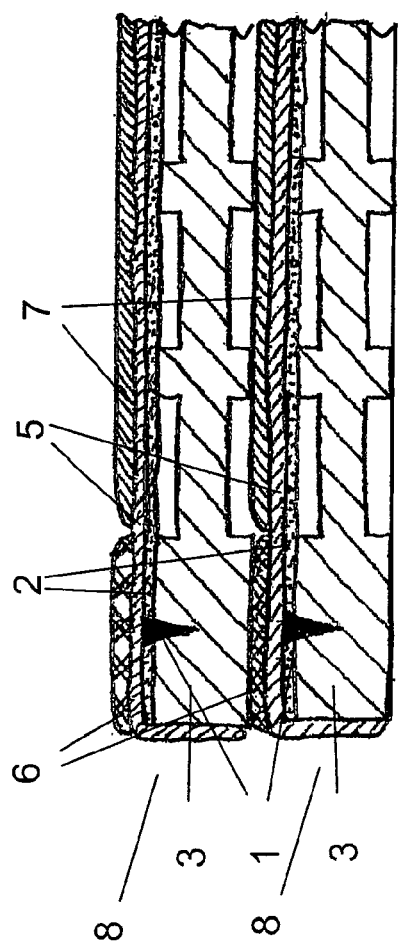
FIG. 7 shows two units arranged next to each other.

FIG. 7 shows two repetitive units 8 stacked next to each other. In this way a fuel cell stack as in FIG. 1 can be manufactured by stacking one or more repetitive units 8 next to each other.

Figure 8:
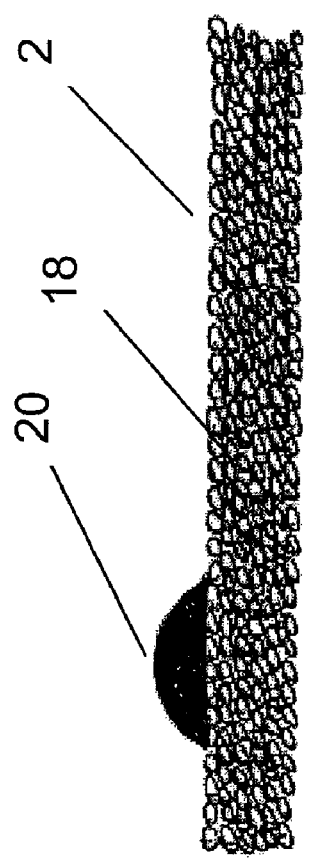
FIGS. 8 and 9 show the porous metal support prepared for sealing by brazing.
Figure 9:
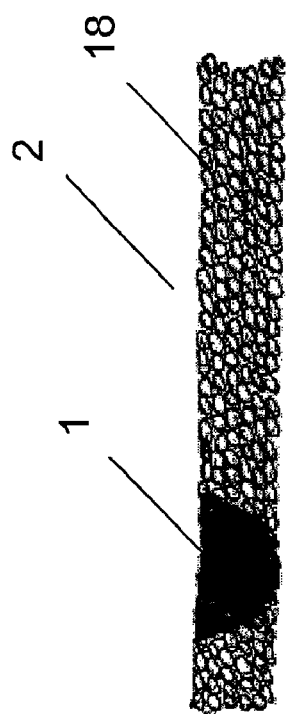

FIGS. 8 and 9 show the porous metal support 2 prepared for sealing by brazing. FIG. 8 shows a filler material 20 placed on the upper surface 18 of porous metal support 2. The porous metal support 2 is then heated and filler material 20 enters the pores of porous metal support 2 to create seal 1, as shown in FIG. 9.

EXAMPLE 1

A seal was made in a 0.3 mm thick porous metal support the seal extending into a 0.8 mm thick interconnect. The interconnect was made of ferritic stainless steel with 22% chromium and the porous metal support was made of a porous ferritic sinter metal foil.

It was possible to obtain a seal depth extending from the upper surface of the porous metal support through to the bottom surface of the porous metal support and further 0.3-0.5 mm into the interconnect by fusing with a laser with fusing speeds varying from 800 to 1400 mm/min and a laser power varying between 350 and 400 W.

The invention claimed is:

1. A method of manufacturing a unit for a fuel cell stack comprising the steps of fusing a part of a porous metal support along its periphery in a contact area into a gas impermeable seal with a seal depth, the seal depth extending from the upper surface of the porous metal support and at least through the porous metal support to the bottom of the porous metal support, wherein the porous metal support comprises an anode applied inside a porous structure in the porous metal support.

2. A method according to claim 1, wherein the step of fusing a part of a porous metal support further comprises simultaneous fusion with a part of an interconnect such that the seal depth further extends into the interconnect.

3. A method according to claim 1, wherein the fusing is made by heating with a laser.

4. A method according to claim 1, wherein the fusing is made by a process selected from laser heating, resistance heating, electron beam heating and brazing.

5. A method according to claim 1, wherein at least part of the seal is positioned along the periphery of a gas channel.

6. A method according to claim 1, wherein the electrochemically active area of each fuel cell in the fuel cell stack is segmented into a plurality of smaller individual electrochemically active segments on a support structure, and the seal is positioned along the individual periphery of each electrochemically active segment.

7. A method according to claim 1, wherein the porous metal support is a metal foil.

8. A method according to claim 1, wherein the seal is positioned in a contact area between an interconnect and the porous metal support.

9. A method according to claim 1, wherein the seal depth extends further into an interconnect.

10. A method according to claim 1, wherein the porous metal support comprises an electrolyte and a cathode applied to the porous metal support.

11. A method according to claim 1, wherein the unit is for use in a high temperature fuel cell.

12. A method according to claim 8, wherein the unit is for use in a solid oxide fuel cell.

* * * * *